April 3, 1934.  K. E. MOREE  1,953,360
TRACTOR
Original Filed Nov. 10, 1927  3 Sheets-Sheet 1
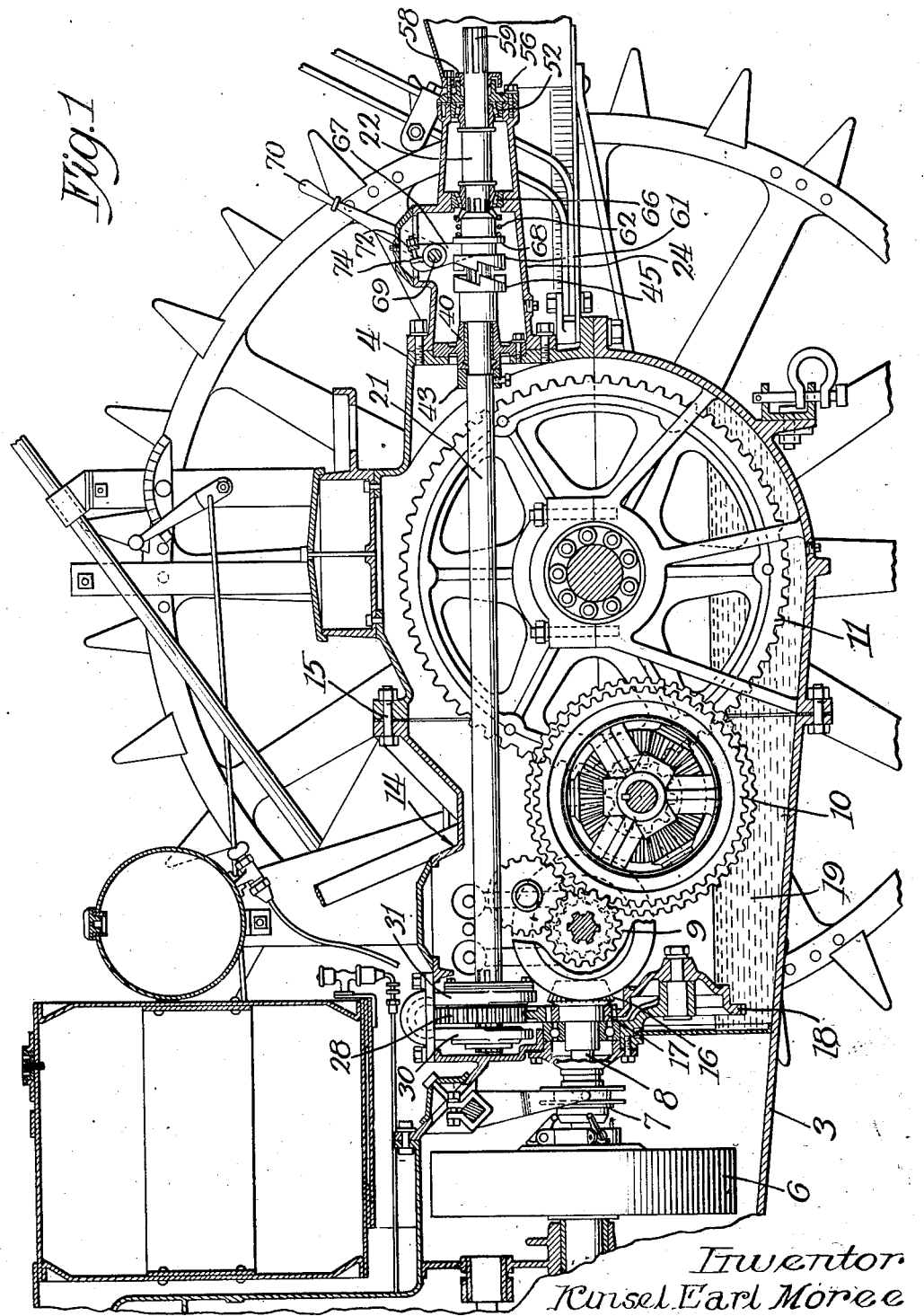

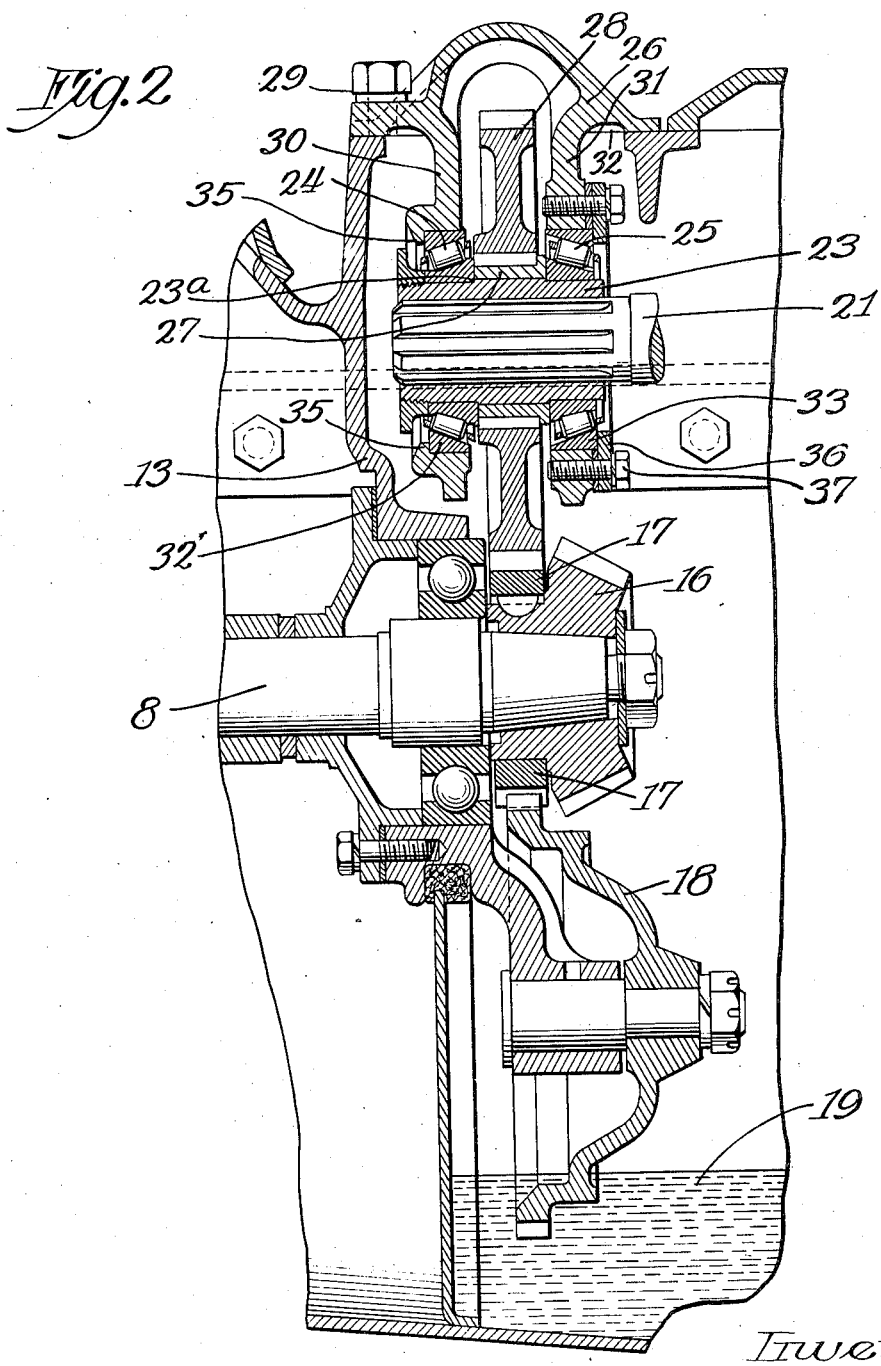

April 3, 1934.    K. E. MOREE    1,953,360
TRACTOR
Original Filed Nov. 10, 1927    3 Sheets-Sheet 3
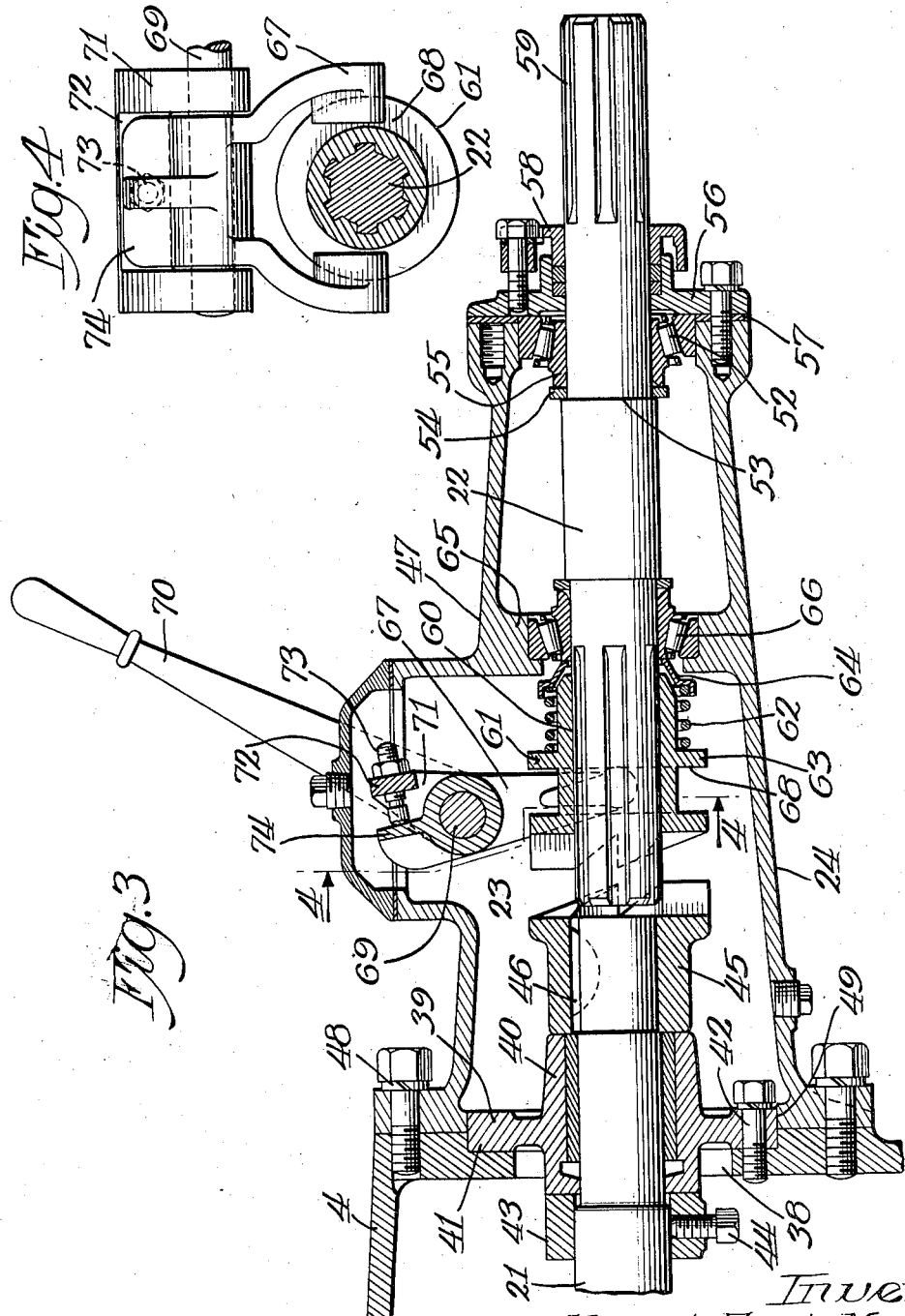
Inventor
Kinsel Earl Moree
By Rector Hibben Davis  
Attys.

Patented Apr. 3, 1934

1,953,360

UNITED STATES PATENT OFFICE 1,953,360

TRACTOR

Kinsel Earl Moree, Racine, Wis., assignor to The Massey-Harris Co., Racine, Wis., a corporation of Maryland Original application November 10, 1927, Serial No. 232,288. Divided and this application February 27, 1931, Serial No. 518,642

7 Claims. (Cl. 74—7)

The present invention relates to a power take-off for tractors and is illustrated in connection with a tractor of the type shown in the patent to Eason and Hendrickson No. 1,205,982, granted November 28th, 1916. The present application is a division of an application No. 232,288 filed by me November 10, 1927, in which certain other inventions disclosed herein are claimed.

The object of the present invention is to provide a power take-off for driving the mechanism of agricultural implements or the like attached to the rear end of the tractor and propelled thereby. A feature of the invention relates to the interposition of a manually-controlled one-way clutch, so that in the event that the tractor is stopped more or less suddenly, the moving parts of the implement drawn thereby may be permitted to continue movement under the effect of inertia without injuring or straining the parts either of the tractor or of the implement. Another feature of the invention relates to a construction by which the power take-off may be readily and quickly removed from and replaced in the tractor when desired.

In the drawings accompanying and forming a part of this application,

Figure 1 represents a tractor of the class described embodying my invention in central, vertical, longitudinal section, the front part of the tractor being broken away;

Fig. 2 is a similar section on an enlarged scale, certain parts shown in elevation in Fig. 1 being shown in section in Fig. 2;

Fig. 3 is a similar section on an enlarged scale of another portion of the tractor; and Fig. 4 is a transverse section of a detail.

Referring to the drawings, it will be seen that in the embodiment of the invention chosen for illustration, the main frame of the tractor comprises a trough-like shell 3, the rear end of which is closed by a housing 4, the shell and housing together supporting and containing the flywheel 6 of the engine, the clutch 7, and a stub shaft 8 driven by the clutch and which in turn drives the transmission mechanism 9. The transmission mechanism 9, as usual drives a differential mechanism 10 which in turn, through bull wheels 11, drives the tractor wheels.

Inasmuch as the elements just mentioned are commonly employed in tractors of this type and their specific construction is immaterial here, it is not thought necessary to further describe them. It may be mentioned, however, that in the specific construction shown the stub shaft 8 is journaled in a bracket or web 13 formed with or secured to the casting 14 which supports the transmission mechanism and that said casting forms a part of the cover of the shell 3 and is bolted at 15 to the housing 4.

Turning now to the portion of the mechanism to which my invention more particularly relates, and referring more particularly to Fig. 2 of the drawings, it will be seen that upon the neck of the bevel pinion 16 upon the stub shaft is keyed a spur gear 17. An idler 18 dipping in a pool of oil 19 in the shell and meshing with gear 17 conveys lubricating oil to the latter and to the adjacent bearing of the stub shaft.

The spur gear 17, above mentioned, serves to transmit power to the power take-off shaft.

The power take-off shaft is mounted longitudinally of the tractor and is composed of a front section 21 and a rear section 22 connected by a one-way clutch, to be presently described, the rear end of section 22 being formed for connection by shafting or otherwise to the mechanism of an agricultural or other implement attached to the rear end of the tractor. Referring more particularly to Fig. 2 of the drawings the forward end of shaft 21 is keyed into a sleeve 23 from which it is axially removable. Sleeve 23 is journaled in roller bearings 24, 25, the outer races of which are mounted in a casting 26 to be presently described. The central portion of sleeve 23 is of slightly larger diameter than the end portions thereof to provide shoulders 23ª against which the inner races of the bearings abut and upon the central portion of the sleeve I provide a short collar 27 of a length equal to that of the enlarged central portion of the sleeve and to which is keyed a gear wheel 28 which meshes with the above-mentioned gear 17 so that gear 28 is driven by the latter and in turn through sleeve 23 drives the front section 21 of the power shaft. Obviously, the collar 27 could be omitted and the gear keyed directly to the sleeve.

Casting 26 comprises a cover plate portion which is bolted at 29 over an opening in the transmission supporting casting. A pair of brackets 30, 31 is cast integral with casting 26 and project through the opening 32 in the transmission supporting casting. The lower ends of the bracket are ring-shaped to provide seats for the outer races 32', 33 of the respective roller bearings in which sleeve 23 is journaled. Race 32' abuts against a shoulder 35 formed on bracket 30 and race 33 is held in position in a seat against outward pressure by an annulus 36 bolted at 37 to bracket 31. The construction is such that after the power take-off shaft 21 has been withdrawn casting 26 may be unbolted and removed through the top opening in casting 14 together with the gear, bearings and sleeve carried thereby.

The rear end of the front section 21 of the power take-off shaft projects through an opening 38 in the rear wall of housing 4. This section of the power take-off shaft is supported from housing 4 by means of a journal casting 39 which is formed with a journal boss 40 and a surrounding flange 41, the latter being bolted to the rear wall of housing 4 at 42. A collar 43 is secured to shaft 21 by a set bolt 44 and limits the rearward movement of the shaft and prevents it from leaving the sleeve 23.

Beyond the journal casting 39 the shaft section 21 is provided with a one-way clutch jaw 45 which is keyed thereto at 46.

The rear member 22 of the power take-off shaft is journaled in a detachable housing 47 which is bolted to housing 4 at 48. Housing 47 at its forward end, is formed with an opening 49 which fits around the flange 41 of journal casting 39 to insure the proper relative position of the parts. The rear end of the housing is bored out to form a seat for the outer race of roller bearing 52 in which the rear end of shaft section 22 is journaled. The rear end of said shaft section is slightly reduced to form a shoulder at 53 against which abuts a facing ring or gasket 54 which limits the forward movement of the inner race 55 of said roller bearing. In order to keep out dust and dirt the opening through the rear end of casting 47 is closed by a cover plate 56 bolted thereto with an intermediate gasket 57. The rear end of shaft 22 extends through said cover plate and a gland 58 is provided as a further protection against the entrance of dust and dirt. I have shown the rear end of shaft section 22 as keyed at 59 for convenient connection of shafting for driving the mechanism of an implement attached to the rear of the tractor.

The front end of shaft 22 is keyed at 60 for the reception of the axially movable member 61 of the jaw clutch above mentioned. A spring 62 surrounds the rear end of member 61 and is interposed between a flange 63 on the same and a concavo-convex collar 64 which surrounds the shaft. The housing 47 is formed with a web 65 in which is formed a seat for the roller bearing 66 in which shaft 22 is journaled, and the collar 64 abuts against the end of the inner race of said bearing to resist the pressure of the spring 62.

Normally, the clutch is closed by the spring, but in the event that the section 22 tends to revolve faster than the section 21 of the power take-off shaft, as for example when the tractor mechanism is suddenly stopped and the inertia of the revoluble parts of the implement connected to the tractor keeps them in motion for a time, the section 61 of the clutch backs off, thus permitting such relative movement of the shaft sections without injury or strain.

In certain contingencies it is necessary or desirable to open the clutch at the will of the operator. For this purpose I have provided a shifting fork 67, the ends of which are formed to engage in a channel 68 in the axially movable clutch member. The fork is pivoted upon a cross shaft 69 which outside the housing, is provided with a handle 70. Inside the housing the shaft is provided with a yoke 71 the cross member of which 72 is provided with an adjustable stop bolt 73 to engage a fin 74 on the fork. Thus the movable clutch member is free to move rearwardly without disturbing the handle 70, but the latter can be used, when desired, to manually release the clutch.

When it is desired to remove the power take-off mechanism, either to dispense with the same or for purposes of repairs, or the like, the housing 47 with the parts supported thereby is removed thus making the supporting casting 39 accessible. The latter may then be unbolted and removed rearwardly from the tractor together with the front shaft section 21, which slips out of the sleeve 23. Casting 26 with the gear wheel and sleeve carried thereby may, if desired, be removed and the opening left by its removal closed in some suitable way as by a supplemental cover plate.

I claim:

1. In a tractor of the class described having a hollow enclosing frame and transmission mechanism mounted on and extending thereinto, a shaft directly driven by the engine, a gear thereon, a second gear in mesh with the first mentioned gear, a detachable closure plate on which said second gear is journaled, said plate being secured over an opening in the top of said frame, a shaft removably keyed to said second gear and extending rearwardly therefrom, a detachable bearing plate secured to the frame of the tractor and in which the rear end of said last mentioned shaft is journaled and means for connecting said last mentioned shaft to a machine to be driven thereby.

2. In a tractor of the class described having a hollow enclosing frame and transmission mechanism mounted on and extending into the same, a shaft directly driven by the engine, a gear thereon, a second gear in mesh with the first mentioned gear, a casting on which said second gear is journaled, said casting being deachably secured to the frame, a power take-off shaft extending longitudinally of the tractor and detachably engaging said second named gear and driven thereby, a bearing in which the rear end of said power take-off shaft is journaled detachably secured to the frame, and means for connecting a machine to be driven thereby to said power take-off shaft.

3. In a tractor of the class described comprising a hollow frame, a transmission mechanism mounted on said frame, a stub shaft geared to the transmission mechanism, a clutch intermediate said stub shaft and the crank shaft of the engine, a gear on said stub shaft, a power take-off gear in mesh with the first-mentioned gear, a support for the power take-off gear in which the latter is journaled, said support being detachably secured to the frame of the transmission mechanism, a power take-off shaft removably keyed to said power take-off gear and extending rearwardly thereof and through the rear wall of the tractor frame and means for connecting the rear end of said shaft to a mechanism to be driven thereby.

4. In a tractor of the class described comprising a hollow frame, a transmission mechanism mounted on said frame, a stub shaft in alignment with the crank shaft of the engine and geared to the transmission mechanism, a clutch intermediate said stub shaft and the crank shaft of the engine, a gear on said stub shaft, a power take-off gear in mesh with the first-mentioned gear, a support for the power take-off gear in which the latter is journaled, said support being detachably secured to the frame of the transmission mechanism, a power take-off shaft removably keyed to said power take-off gear and extending rearwardly thereof and through the rear wall of the tractor frame, means for connecing the rear end of said shaft to a mechanism to be driven thereby, and a lubricating gear in mesh with the gear on the stub shaft.

5. In a tractor of the class described, comprising a hollow frame, a transmission mechanism mounted on said frame, a stub shaft in alignment with the crank shaft of the engine and geared to the transmission mechanism, a clutch intermediate said stub shaft and the crank shaft of the engine, a gear on the stub shaft, a second gear in mesh therewith, a mounting for said second gear detachable from the frame of the tractor, a power take-off shaft removably keyed to the latter gear and extending rearwardly therefrom and through an opening in the rear wall of the tractor frame and adapted for connection to a mechanism to be driven thereby and a bearing plate closing the opening in the frame and in which said shaft is journaled.

6. In a tractor of the class described comprising a hollow frame, a transmission mechanism mounted on said frame, a stub shaft in alignment with the crank shaft of the engine and geared to the transmission mechanism, a clutch intermediate said stub shaft and the crank shaft of the engine, a gear on said stub shaft, a power take-off gear in mesh with the first-mentioned gear, a sleeve to which the last-mentioned gear is keyed, a casting comprising a closure plate and brackets, said sleeve being journaled in said brackets, a power take-off shaft splined in said sleeve and removable rearwardly therefrom, a bearing plate secured to the tractor frame and in which the rear end of said power take-off shaft is journaled, said power take-off shaft extending through the bearing plate.

7. In a tractor of the class described having a hollow enclosing frame and transmission mechanism mounted on and extending into the same, a shaft driven by the engine, a gear thereon, a second gear in mesh with the first mentioned gear, a casting on which said second gear is journaled, said casting being detachably secured to the frame, a power take-off shaft extending longitudinally of the tractor and detachably engaging said second gear and driven thereby, a bearing in which the rear end of said power take-off shaft is journaled detachably secured to the frame, means for connecting a machine to be driven thereby to said power take-off shaft, and a lubricating gear in mesh with said first-mentioned gear.

KINSEL EARL MOREE.